124,559

UNITED STATES PATENT OFFICE.

JOSIAH S. ELLIOTT, OF CHELSEA, AND JOHN F. WOOD, OF EVERETT, MASS.

IMPROVEMENT IN PROCESSES OF REPAIRING MILLSTONES.

Specification forming part of Letters Patent No. 124,559, dated March 12, 1872.

SPECIFICATION.

*To whom it may concern:*

Be it known that we, JOSIAH S. ELLIOTT, of Chelsea, in the State of Massachusetts, and JOHN F. WOOD, of Everett, in said State, have invented a new and useful Process for Repairing Millstones; and we do hereby declare the following to be a full and correct description of the same.

Our invention is more especially applicable to burr millstones, but may be applied to any millstones. It is well-known that burr-stones make excellent millstones, but, as found in the natural state, the stone is full of cavities and flaws, and in wear the stone occasionally shells or flakes so as to become unfit for grinding. Burr-stones are imported at great expense. It is, therefore, especially desirable to preserve them for use as long as possible.

For this purpose we reduce to a coarse powder any stone of requisite hardness—preferably, fragments of burr-stone itself; but any stone of similar hardness and grit will answer. With the powdered stone we thoroughly mix and incorporate, in a dry state, from about ten to about twenty per cent. in weight of the oxide of zinc, and then moisten the mixture with chloride of zinc until it will hold the shape given it by compressing in the hand; or, for the oxide of zinc and the chloride of zinc we substitute, respectively, the oxide of magnesium and the chloride of magnesium, or its equivalent, following the instructions set forth in the several Letters Patent of the United States granted Stanislas Sorel for improvements in the manufacture of artificial stone and cements—viz: Letters Patent No. 53,092, dated March 6, 1866; Letters Patent No. 100,944, dated March 15, 1870; and Letters Patent No. 100,945, dated March 15, 1870.

The mixture thus made is applied to defective millstones in the following manner: The cavity to be filled is cleaned, and the parts of the stone to which the cement or mixture above described is to adhere, are washed with the chloride of zinc; or, where the oxide of magnesium is used as the base of the cement, with the chloride of magnesium. If the sides of the cavity are smooth we hack them to make them rough before washing with the chloride. The cavity is then filled by driving in the cement with a tamp and hammer, where possible, and otherwise by spreading with a trowel.

The stone can be used two days after it is repaired, but it will be better, if possible, to allow it to stand longer, as the repaired part will continue to harden and will ultimately equal the original stone.

We claim—

The above-described process of repairing millstones.

The above specification of our said invention signed and witnessed at Boston this 2d day of February, A. D. 1872.

J. S. ELLIOTT.
JNO. F. WOOD.

Witnesses:
WILLIAM W. SWAN,
H. FARNAM SMITH.